(12) United States Patent
Sakai (10) Patent No.: US 11,278,999 B2
(45) Date of Patent: Mar. 22, 2022

(54) MANUFACTURING METHOD OF IMPELLER

(71) Applicant: MITSUBISHI HEAVY INDUSTRIES COMPRESSOR CORPORATION, Tokyo (JP)

(72) Inventor: Yasunori Sakai, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 17/205,636

(22) Filed: Mar. 18, 2021

(65) Prior Publication Data

US 2021/0299812 A1  Sep. 30, 2021

(30) Foreign Application Priority Data

Mar. 25, 2020  (JP) .............................. JP2020-054321

(51) Int. Cl.
| | |
|---|---|
| *B24B 19/14* | (2006.01) |
| *F01D 5/02* | (2006.01) |
| *B23P 15/02* | (2006.01) |
| *F04D 29/28* | (2006.01) |

(52) U.S. Cl.
CPC .............. *B24B 19/14* (2013.01); *B23P 15/02* (2013.01); *F01D 5/02* (2013.01); *F04D 29/284* (2013.01); *F05D 2230/10* (2013.01)

(58) Field of Classification Search
CPC . B24B 19/14; F01D 5/02; B23P 15/02; F05D 2230/10; F04D 29/284
See application file for complete search history.

(56) References Cited

U.S. PATENT DOCUMENTS

| | | | |
|---|---|---|---|
| 2019/0003322 A1 | 1/2019 | Rettberg et al. | |
| 2019/0308285 A1* | 10/2019 | Dommermuth | ......... B22F 10/20 |
| 2019/0376526 A1* | 12/2019 | Morikawa | ................ B24C 9/00 |

* cited by examiner

*Primary Examiner* — Moshe Wilensky
(74) *Attorney, Agent, or Firm* — Osha Bergman Watanabe & Burton LLP (57) ABSTRACT

A manufacturing method of an impeller, the manufacturing method includes: a step of forming an impeller shaped body in which a disc component part constituting a part of the disc, a blade component part constituting a part of the blade, and a cover component part constituting a part of the cover are integrated by laminating a metal layer to extend toward an outer side in a radial direction with respect to the axis by an additive manufacturing method using a metal powder; and a step of grinding the impeller shaped body, in which the steps are repeated a plurality of times, and the step of grinding the impeller shaped body includes a step of polishing an inner surface of the impeller shaped body constituting a part of the flow path.

4 Claims, 10 Drawing Sheets

MANUFACTURING METHOD OF IMPELLER

BACKGROUND OF THE INVENTION

Field of the Invention

The present disclosure relates to a manufacturing method of an impeller.

Priority is claimed on Japanese Patent Application No. 2020-054321, filed on Mar. 25, 2020, the content of which is incorporated herein by reference.

Description of Related Art

For example, an impeller used in a rotary machine such as a centrifugal compressor includes a disc, a blade, and a cover. The disc is fixed to a rotary shaft provided in the rotary machine. A plurality of the blades are provided on a surface of the disc at an interval in a circumferential direction. The cover covers the blades from a side opposite to the disc. The impeller has a flow path which is defined between the disc, the cover, and the blades adjacent to each other in the circumferential direction and through which a fluid flows.

United States Patent Application, Publication No. 2019/0003322 discloses a method of forming an impeller using an additive manufacturing method. In the additive manufacturing method, a material layer is laminated by inputting energy to a powder material applied to a treatment surface to form an impeller having a predetermined shape.

SUMMARY OF THE INVENTION

Incidentally, when the impeller is formed by the additive manufacturing method, it is necessary to smoothly polish surfaces of the disc, the cover, and the blade that form the flow path, in order to form the flow path inside the impeller. However, in some cases, such as when a gap between the disc and the cover is small or when the blade is largely curved, it is difficult to insert a polishing tool for polishing work into the flow path. As a result, it is not possible to sufficiently polish the blade formed in a complicated shape, and it is difficult to ensure the accuracy of the flow path, in some cases.

The present disclosure provides a manufacturing method of an impeller which can form an impeller having a blade sufficiently polished by an additive manufacturing method.

According to an aspect of the present disclosure, there is provided a manufacturing method of an impeller that includes a disc having a disc shape with an axis as a center, a plurality of blades formed on a surface of the disc facing a first side in an axial direction in which the axis extends at an interval in a circumferential direction around the axis, and a cover covering the plurality of blades from the first side in the axial direction and in which a flow path is formed between the disc, the cover, and the plurality of blades, the manufacturing method including: a step of forming an impeller shaped body in which a disc component part constituting a part of the disc, a blade component part constituting a part of the plurality of blades, and a cover component part constituting a part of the cover are integrated by laminating a metal layer to extend toward an outer side in a radial direction with respect to the axis by an additive manufacturing method using a metal powder; and a step of grinding the impeller shaped body. The step of forming the impeller shaped body and the step of grinding the impeller shaped body are repeated a plurality of times.

The step of grinding the impeller shaped body includes a step of polishing an inner surface of the impeller shaped body constituting a part of the flow path.

According to the manufacturing method of the impeller of the present disclosure, an impeller having a blade sufficiently polished can be formed by an additive manufacturing method.

DETAILED DESCRIPTION OF THE INVENTION (Configuration of Impeller)

Figure 1:
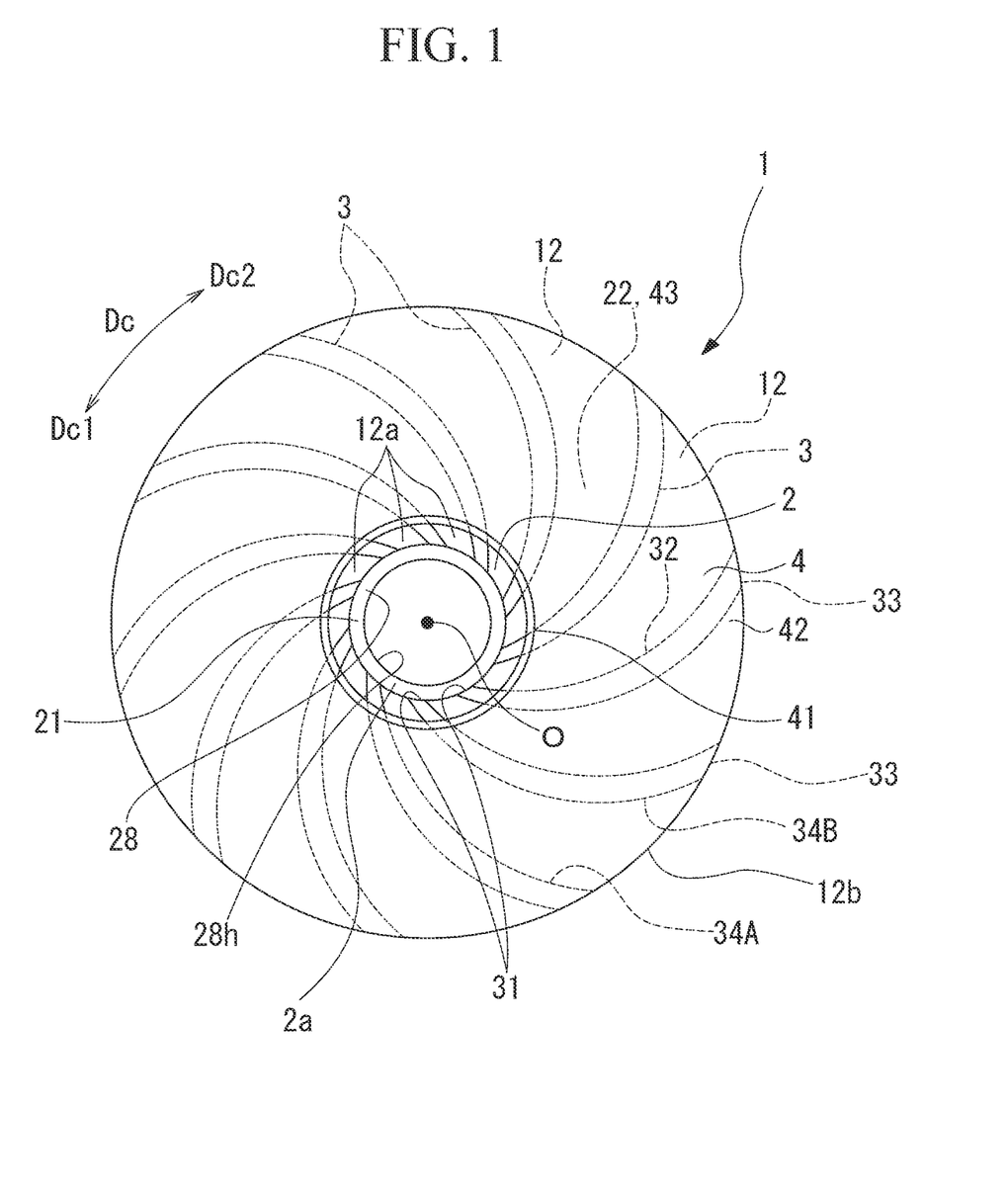
FIG. 1 is a view of an impeller manufactured by a manufacturing method of an impeller according to the present embodiment as viewed from an axial direction of the impeller.
Figure 2:
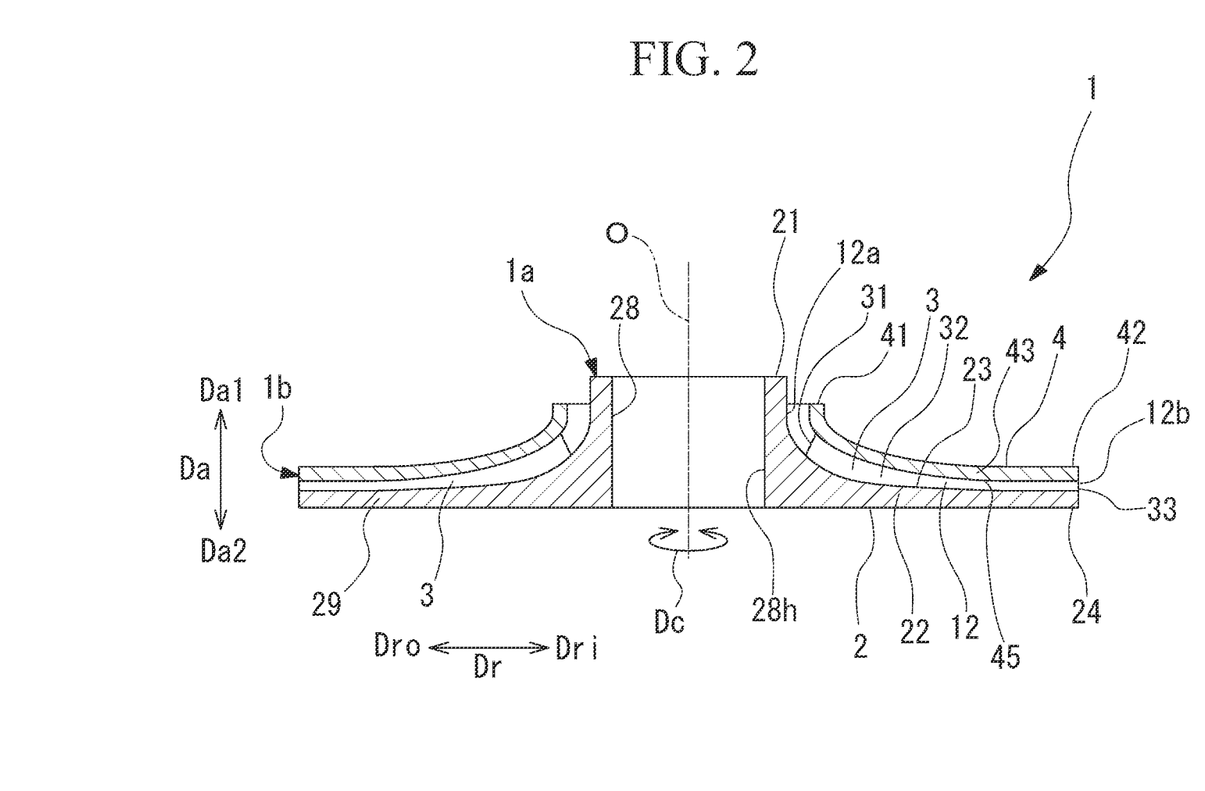
FIG. 2 is a sectional view of the impeller shown in FIG. 1 as viewed in a section taken along an axis of the impeller.

An impeller manufactured in the present embodiment is mounted on a rotary machine such as a centrifugal compressor, for example. As shown in FIGS. 1 and 2, an impeller 1 includes a disc 2, a blade 3, and a cover 4.

The disc 2 has a substantially circular shape when viewed from an axial direction Da in which an axis O extends. The disc 2 is formed in a disc shape with the axis O as the center. More specifically, the disc 2 is formed such that the dimension thereof in a radial direction Dr with the axis O as the center gradually increases from a disc inner peripheral end 21 on a first side Da1 (upper side in FIG. 2) toward a disc outer peripheral end 24 on a second side Da2 (lower side in FIG. 2) in the axial direction Da. The disc 2 has a disc concave surface 23, which is curved to be recessed toward the second side Da2 (side of the cover 4 where the disc 2 is disposed) in the axial direction Da, as a surface facing the first side Da1 (side of the disc 2 where the cover 4 is disposed) in the axial direction Da.

In addition, a tubular portion 28 extending in the axial direction Da is formed at the center of the disc 2 in the radial direction Dr with respect to the axis O. A shaft insertion hole 28h is formed in the tubular portion 28 so as to penetrate in the axial direction Da. A rotary shaft (not shown) of the rotary machine is insertable into the shaft insertion hole 28h in the axial direction Da. According to this, the impeller 1 is integrally rotatable with the rotary shaft of the rotary machine to a first side Dc1 in a circumferential direction Dc with the axis O as the center. On an outer side Dro of the tubular portion 28 in the radial direction Dr, a disc main body 29 having a disc shape is formed integrally with the tubular portion 28. The disc main body 29 is formed such that the outer diameter thereof gradually increases from the first side Da1 toward the second side Da2 in the axial direction Da.

The blade 3 is formed to be erected from the disc concave surface 23 to the first side Da1 in the axial direction Da. A plurality of the blades 3 are formed on the disc concave surface 23 at an interval in the circumferential direction Dc. Each blade 3 is formed to extend from an inner side Dri (side of the blade 3 where the axis O is disposed) toward an outer side Dro of the disc 2 in the radial direction Dr. The blade 3 is curved from a blade inner peripheral end 31 which is an end on the inner side Dri in the radial direction Dr to a blade outer peripheral end 33 which is an end on the outer side in the radial direction Dr when viewed from the axial direction Da. In the blade 3, a blade intermediate portion 32, which is the center in the radial direction Dr, is curved to be recessed to a second side Dc2 in the circumferential direction Dc between the blade inner peripheral end 31 and the blade outer peripheral end 33 when viewed from the axial direction Da. The blade 3 has a blade concave surface 34A facing the first side Dc1 in the circumferential direction Dc and a blade convex surface 34B facing the second side Dc2 in the circumferential direction Dc. The blade concave surface 34A is curved to be recessed to the second side Dc2 in the circumferential direction Dc at the blade intermediate portion 32 when viewed from the axial direction Da. The blade convex surface 34B is curved to protrude to the second side Dc2 in the circumferential direction Dc at the blade intermediate portion 32 when viewed from the axial direction Da.

The cover 4 is spaced apart from the disc concave surface 23 at an interval in the axial direction Da. The cover 4 is disposed to cover the plurality of blades 3 from the first side Da1 in the axial direction Da. The cover 4 has a disc shape with the axis O as the center. Specifically, the cover 4 has an umbrella shape in which a diameter gradually decreases from the second side Da2 toward the first side Da1 in the axial direction Da. The cover 4 has a cover convex surface 45 which is curved to protrude toward the second side Da2 in the axial direction Da as a surface facing the second side Da2 in the axial direction Da. A cover inner peripheral end 41 which is an end of the cover 4 on the inner side in the radial direction Dr is spaced apart from the disc inner peripheral end 21 which is an end of the disc 2 on the inner side in the radial direction Dr at an interval in the radial direction Dr. With this, a space between the cover inner peripheral end 41 and the disc inner peripheral end 21 is open to face the first side Da1 in the axial direction Da. In addition, a cover outer peripheral end 42 which is an end of the cover 4 on the outer side in the radial direction Dr is spaced apart from the disc outer peripheral end 24 which is an end of the disc 2 on the outer side in the radial direction Dr at an interval in the axial direction Da. With this, a space between the cover outer peripheral end 42 and the disc outer peripheral end 24 is open to face the outer side Dro in the radial direction Dr.

A plurality of flow paths 12 surrounded by the disc 2, the cover 4, and the blade 3 are formed inside the impeller 1 at an interval in the circumferential direction Dc. One flow path 12 is defined by the blades 3 adjacent to each other in the circumferential direction Dc between the disc 2 and the cover 4. An inner surface forming the flow path 12 is composed of the disc concave surface 23, the cover convex surface 45, the blade concave surface 34A, and the blade convex surface 34B. Each flow path 12 has a flow path inlet 12a that is open between the disc inner peripheral end 21 and the cover inner peripheral end 41 to face the first side Da1 in the axial direction Da. In addition, each flow path 12 has a flow path outlet 12b that is open between the disc outer peripheral end 24 and the cover outer peripheral end 42 to face the outer side Dro in the radial direction Dr. In the impeller 1, an end where the flow path inlet 12a is formed is referred to as an inlet side end 1a. In addition, in the impeller 1, an end where the flow path outlet 12b is formed is referred to as an outlet side end 1b.

A distance (flow path height) between the disc 2 and the cover 4 is formed to be gradually narrowed from the flow path inlet 12a toward the flow path outlet 12b. In addition, an interval (flow path width) in the circumferential direction Dc between the blades 3 adjacent to each other in the circumferential direction Dc is formed to gradually expand from the flow path inlet 12a toward the flow path outlet 12b. Each flow path 12 is formed such that a flow path sectional area thereof gradually decreases from the flow path inlet 12a toward the flow path outlet 12b.

(Procedure of Manufacturing Method of Impeller)

Next, a manufacturing method of the impeller 1 will be described with reference to FIGS. 3 to 12. In a manufacturing method S1 of an impeller, the impeller 1 is manufactured by an additive manufacturing method using a metal powder. In the manufacturing method S1 of the impeller in the present embodiment, the impeller 1 is formed by, for example, a laser metal deposition (hereinafter abbreviated as LMD) method. In the LMD method, a metal powder is supplied through a nozzle to a region (molten pool) formed by irradiating a base material with a laser beam to perform additive manufacturing using a molten metal. The impeller 1 may be manufactured by a method other than the LMD method as long as it is an additive manufacturing method using a metal powder.

In the following description, the impeller 1 being formed in the manufacturing method S1 of the impeller is referred to as an impeller shaped body 100. The impeller shaped body 100 includes a disc component part 200 constituting a part of the disc 2, a blade component part 300 constituting a part of the blade 3, and a cover component part 400 constituting a part of the cover 4. In the impeller shaped body 100, the disc component part 200, the blade component part 300, and the cover component part 400 are integrated as one member.

Figure 3:
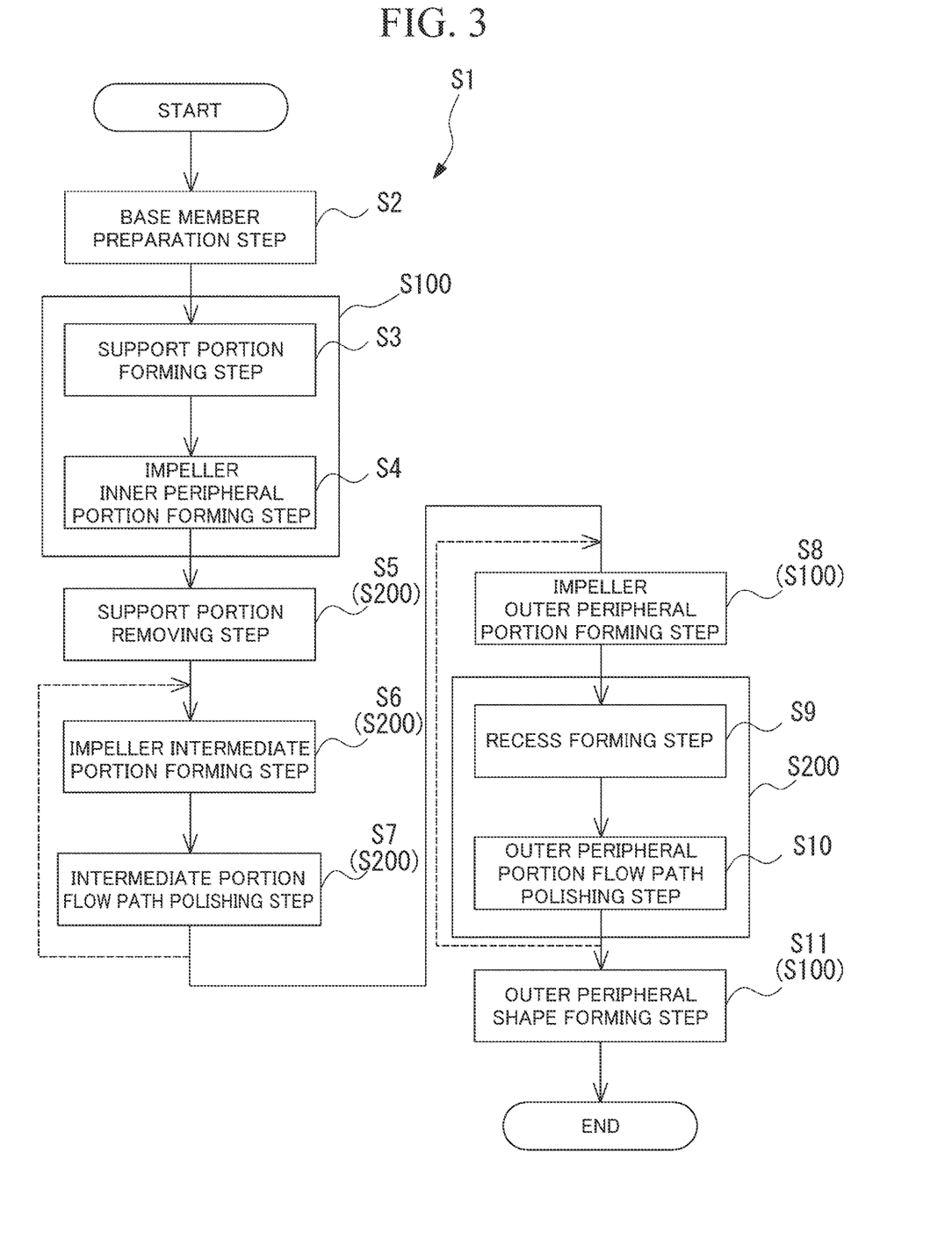
FIG. 3 is a flowchart showing a procedure of the manufacturing method of the impeller according to the present embodiment.

As shown in FIG. 3, the manufacturing method S1 of the impeller in the present embodiment includes a base member preparation step (step of preparing a base member) S2, a forming step (step of forming the impeller shaped body 100) S100, and a grinding step (step of grinding the impeller shaped body 100) S200. In the manufacturing method S1 of the impeller, the forming step S100 and the grinding step S20) are repeated a plurality of times. In the forming step S100, the impeller shaped body 100 is gradually enlarged to have a diameter approximating the final outer diameter of the impeller 1 by laminating a metal layer to extend toward the outer side Dro in the radial direction Dr by an additive manufacturing method using a metal powder. In the forming step S100, for example, in a state where the axis O is inclined (in the present embodiment, for example, the impeller shaped body 100 is laid horizontally so that the axis O is aligned in the horizontal direction), the LMD method is performed while rotating the impeller shaped body 100 around the axis O and moving the nozzle in the axial direction Da. In the grinding step S200, the impeller shaped body 100 enlarged in the forming step S100 is cut, ground, or polished to have a shape approximating the final shape of the impeller 1.

Specifically, the manufacturing method S1 of the impeller in the present embodiment includes the base member preparation step S2, a support portion forming step S3, an impeller inner peripheral portion forming step S4, a support portion removing step S5, an impeller intermediate portion forming step S6, an intermediate portion flow path polishing step S7, an impeller outer peripheral portion forming step S8, a recess forming step S9, an outer peripheral portion flow path polishing step S10, and an outer peripheral shape forming step S11.

Figure 4:
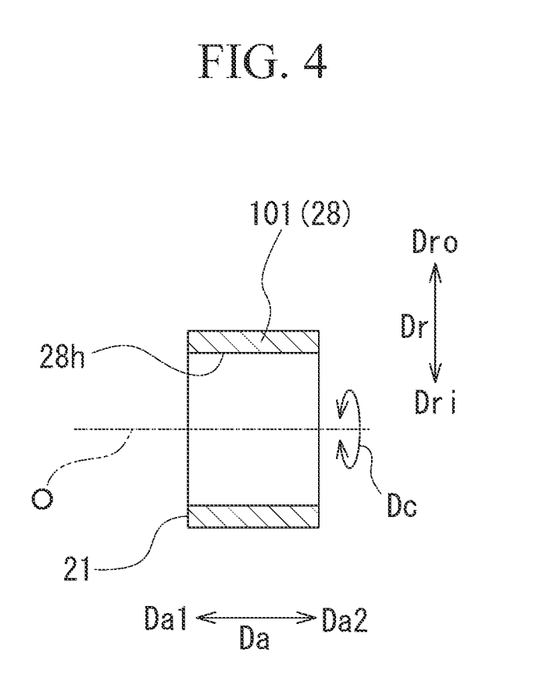
FIG. 4 is a sectional view showing a base member prepared in a base member preparation step according to the present embodiment.

In the base member preparation step S2, the base member 101 is prepared before the forming step S100. As shown in FIG. 4, the base member 101 has a cylindrical shape extending in the axial direction Da and forms at least a part of the tubular portion 28. The shaft insertion hole 28h penetrating in the axial direction Da is formed inside the base member 101. The base member 101 is formed in a predetermined shape in advance by casting, forging, extrusion molding, drawing molding, and an additive manufacturing method such as an LMD method.

Figure 5:
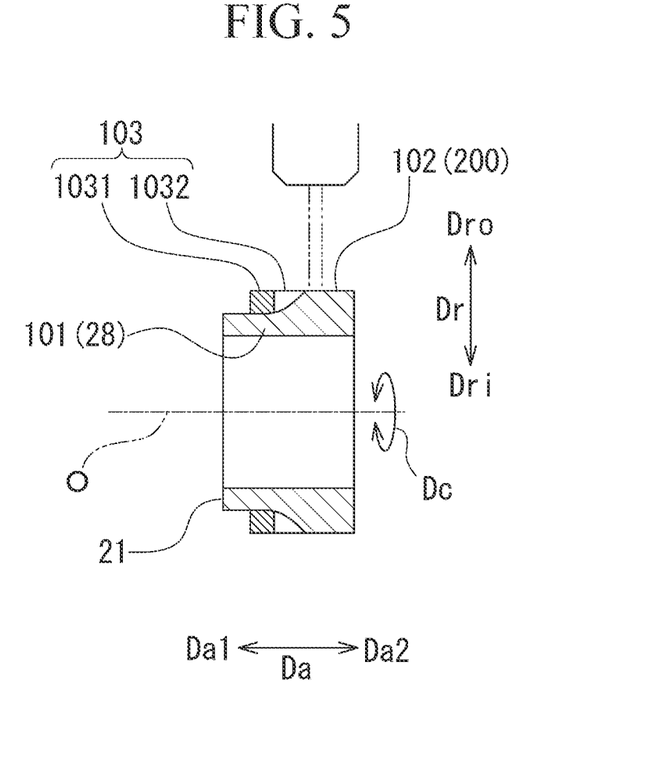
FIG. 5 is a sectional view showing a base portion and a support portion formed in a support portion forming step according to the present embodiment.
Figure 6:
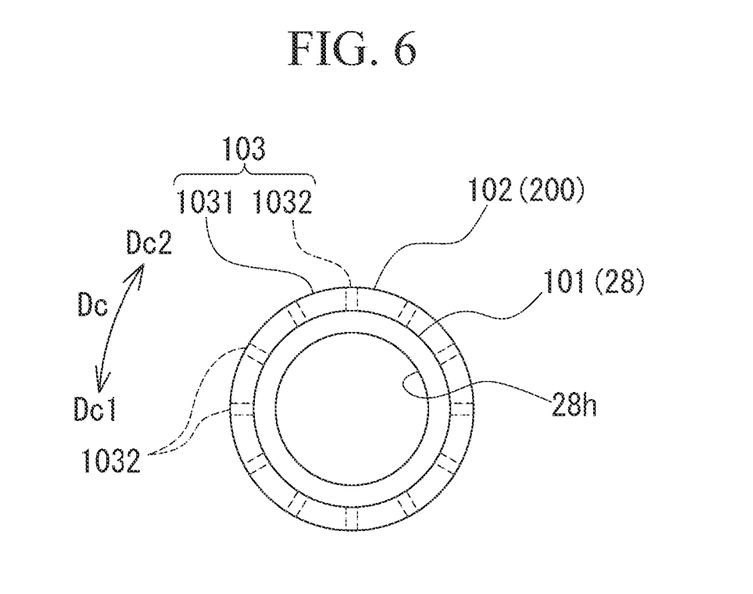
FIG. 6 is a view of the base portion and the support portion formed in the support portion forming step according to the present embodiment as viewed from the axial direction.

The support portion forming step S3 is carried out after the base member preparation step S2. The support portion forming step S3 is a part of the forming step S100. In the support portion forming step S3, as shown in FIGS. 5 and 6, a base portion 102 and a support portion 103 are formed on an outer surface of the base member 101 by an LMD method.

The base portion 102 is formed to be continuous in the circumferential direction Dc with respect to the outer peripheral surface of the base member 101 facing the outer side in the radial direction Dr. The base portion 102 is formed to protrude from the outer peripheral surface of the base member 101 toward the outer side Dro in the radial direction Dr. The base portion 102 is formed on the base member 101 at a position close to the second side Da2 in the axial direction Da. The base portion 102 of the present embodiment is the disc component part 200 and forms a part of the disc 2. That is, the base portion 102 is a region connected to the tubular portion 28 in the disc main body 29.

The support portion 103 is formed to support the cover component part 400 formed apart from the base member 101 and the base portion 102. The support portion 103 protrudes from the outer peripheral surface of the base member 101 toward the outer side Dro in the radial direction Dr. The support portion 103 of the present embodiment integrally includes an annular base part 1031 and a support protrusion part 1032. The annular base part 1031 is formed in an annular shape continuously in the circumferential direction Dc along the outer peripheral surface of the base member 101. The annular base part 1031 is formed to protrude from the outer peripheral surface of the base member 101 toward the outer side Dro in the radial direction Dr. The annular base part 1031 is formed on the base member 101 to be continuous on the first side Da1 in the axial direction Da with respect to the base portion 102.

A plurality of the support protrusion parts 1032 are formed at an interval in the circumferential direction Dc with respect to the annular base part 1031. The support protrusion part 1032 is formed to protrude from the annular base part 1031 toward the second side Da2 in the axial direction Da. The support protrusion part 1032 is formed corresponding to a position where the blade component part 300 is formed in the circumferential direction Dc. That is, the support protrusion part 1032 is formed at a position corresponding to a position where the blade 3 is formed in the circumferential direction Dc. The support protrusion part 1032 is formed to connect the annular base part 1031 and the base portion 102. The support protrusion part 1032 of the present embodiment is formed in a plate shape to form, for example, a surface orthogonal to the circumferential direction Dc. An end of the support protrusion part 1032 on the second side Da2 in the axial direction Da is continuous with the base portion 102.

In the support portion forming step S3, the base portion 102 and the annular base part 1031 are formed by sequentially laminating metal layers from above in the vertical direction, which is the outer side Dro in the radial direction Dr, on the outer peripheral surface of the base member 101 while rotating the base member 101 around the axis O. In addition, each support protrusion part 1032 is formed by sequentially laminating metal layers from the outer side Dro in the radial direction Dr at each angle after rotating the base member 101 around the axis O at a predetermined angle with respect to the base portion 102 and the annular base part 1031.

Figure 7:
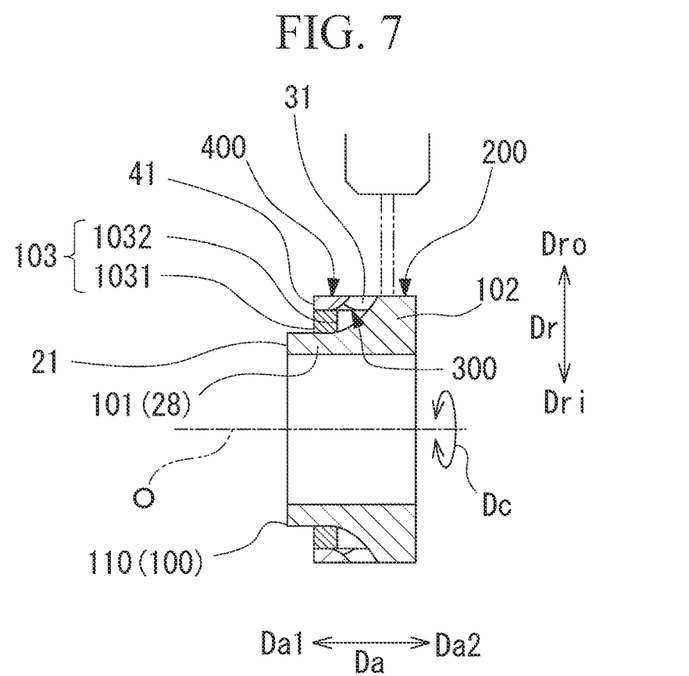
FIG. 7 is a sectional view showing an impeller inner peripheral portion of an impeller shaped body formed in an impeller inner peripheral portion forming step according to the present embodiment.

After the base portion 102 and the support portion 103 are formed in the support portion forming step S3, the impeller inner peripheral portion forming step S4 is carried out. The impeller inner peripheral portion forming step S4 is a part of the forming step S100. The support portion forming step S3 and the impeller inner peripheral portion forming step S4 are the first forming step S100 in the present embodiment. In the impeller inner peripheral portion forming step S4, as shown in FIG. 7, a part of the disc component part 200, a part of the blade component part 300, and a part of the cover component part 400 are formed on the outer side Dro of the base portion 102 and the support portion 103 in the radial direction Dr. Specifically, in the impeller inner peripheral portion forming step S4, a region on the inner side Dri of the disc component part 200, a region on the inner side Dri of the blade component part 300, and a region on the inner side Dri of the cover component part 400 in the radial direction Dr are formed by an LMD method. As a result, in the impeller inner peripheral portion forming step S4, the impeller inner peripheral portion 110 which is a part of the blade component part 30) is formed. Thus, in the impeller inner peripheral portion forming step S4, the impeller inner peripheral portion 110 which is a part of the impeller shaped body 100 is formed.

Specifically, in the impeller inner peripheral portion forming step S4, metal layers are sequentially laminated on the base portion 102 from the outer side Dro in the radial direction Dr. With this, the region on the inner side Dri of the disc component part 200 is formed to extend from the base portion 102 to the outer side Dro of the radial direction Dr.

In addition, metal layers are sequentially laminated from the outer side Dro in the radial direction Dr on the formed region on the inner side Dri of the disc component part 200 and the support protrusion part 1032. With this, a plurality of the regions on the inner side Dri of the blade component part 300 are formed apart from each other in the circumferential direction De to extend from the support protrusion part 1032 to the outer side Dro in the radial direction Dr in a state of being connected to the formed disc component part 200 in the axial direction Da. As a result, in the impeller inner peripheral portion forming step S4, the blade inner peripheral end 31 which is a part of the disc component part 200 is formed.

In addition, metal layers are sequentially laminated from the outer side Dro in the radial direction Dr on the region on the inner side Dri of the blade component part 300 and the support protrusion part 1032. With this, a plurality of the regions on the inner side Dri of the cover component part 400 are formed apart from each other in the circumferential direction Dc to extend from the support protrusion part 1032 to the outer side Dro in the radial direction Dr in a state of being connected to the region on the inner side Dri of the blade component part 300 in the axial direction Da. As a result, in the impeller inner peripheral portion forming step S4, the blade inner peripheral end 31 which is a part of the blade component part 300 is formed.

Figure 8:
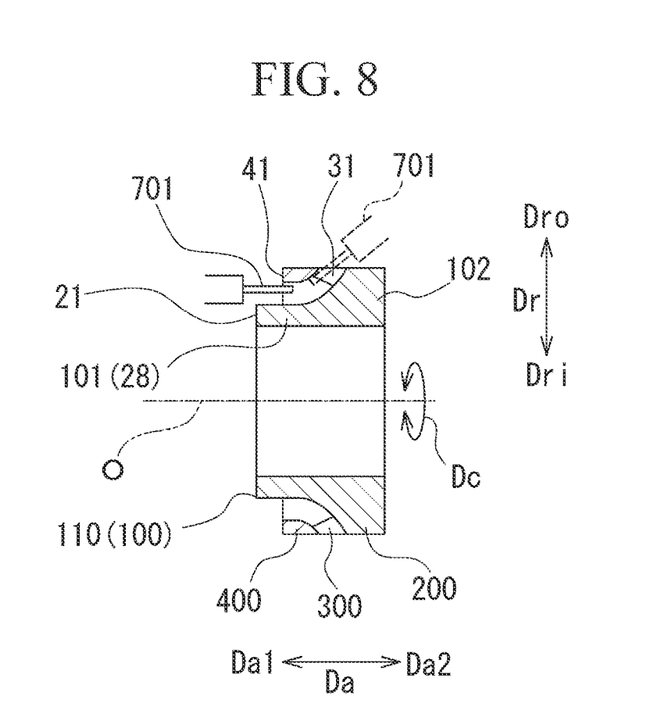
FIG. 8 is a sectional view showing a state in which the support portion is removed in a support portion removing step according to the present embodiment.

After the impeller inner peripheral portion forming step S4 is completed, the support portion removing step S5 is carried out. The support portion removing step S5 of the present embodiment is the first grinding step S200. In the support portion removing step S5, as shown in FIG. 8, a cutting tool 701 is inserted between the base member 101 and the formed region on the inner side Dri of the cover component part 400 from the first side Da1 in the axial direction Da or the outer side Dro in the radial direction Dr. As a result, the support portion 103 (annular base part 1031 and plurality of support protrusion parts 1032) between the base member 101 and the cover component part 400 is removed by cutting work. With this, a space between the cover inner peripheral end 41 and an end (disc inner peripheral end 21) of the base member 101 is open to face the first side Da1 in the axial direction Da.

Figure 9:
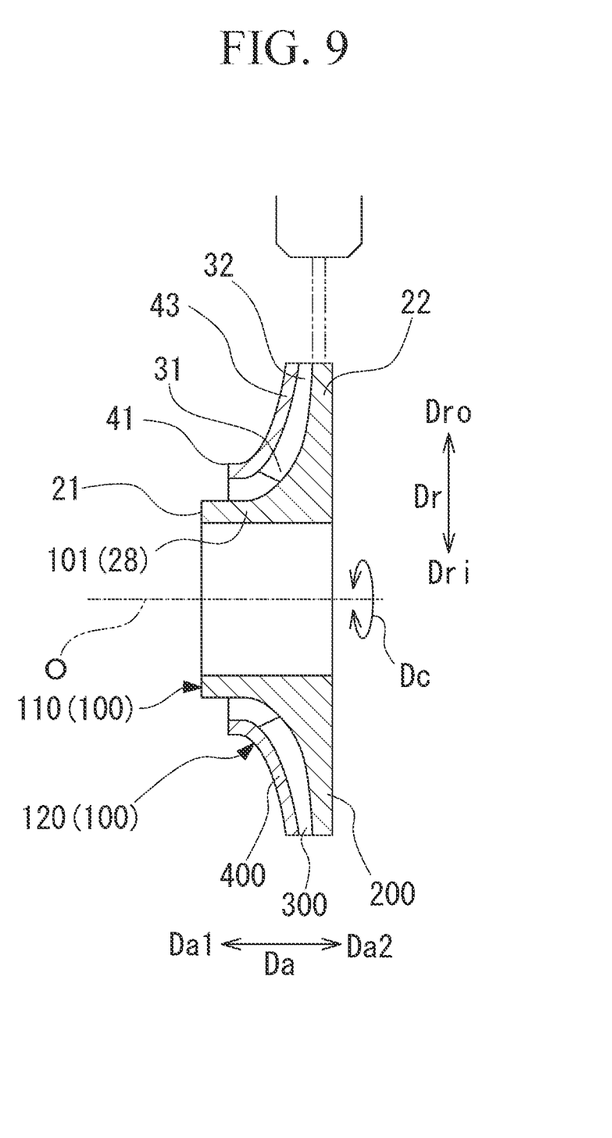
FIG. 9 is a sectional view showing a state in which an impeller intermediate portion of the impeller shaped body is formed in an impeller intermediate portion forming step according to the present embodiment.

After the support portion removing step S5 is completed, the impeller intermediate portion forming step S6 is carried out. The impeller intermediate portion forming step S6 of the present embodiment is the second forming step S100. In the impeller intermediate portion forming step S6, as shown in FIG. 9, the disc component part 200, the blade component part 300, and the cover component part 400 are formed to extend further to the outer side Dro in the radial direction Dr from the impeller inner peripheral portion 110. With this, portions corresponding to a disc intermediate portion 22, the blade intermediate portion 32, and a cover intermediate portion 43 are formed. In the impeller intermediate portion forming step S6, metal layers are sequentially laminated on the impeller inner peripheral portion 110 by an LMD method from the outer side Dro in the radial direction Dr such that the impeller inner peripheral portion 110 expands to the outer side Dro in the radial direction Dr by a predetermined dimension over the whole circumference when viewed from the axial direction Da. With this, the diameter of the impeller shaped body 100 gradually increases. As a result, an impeller intermediate portion 120 having the disc intermediate portion 22, the blade intermediate portion 32, and the cover intermediate portion 43 is formed. The impeller intermediate portion 120 is a part of the impeller shaped body 100 and is a region continuous with the impeller inner peripheral portion 110 on the outer side Dro in the radial direction Dr.

Figure 10:
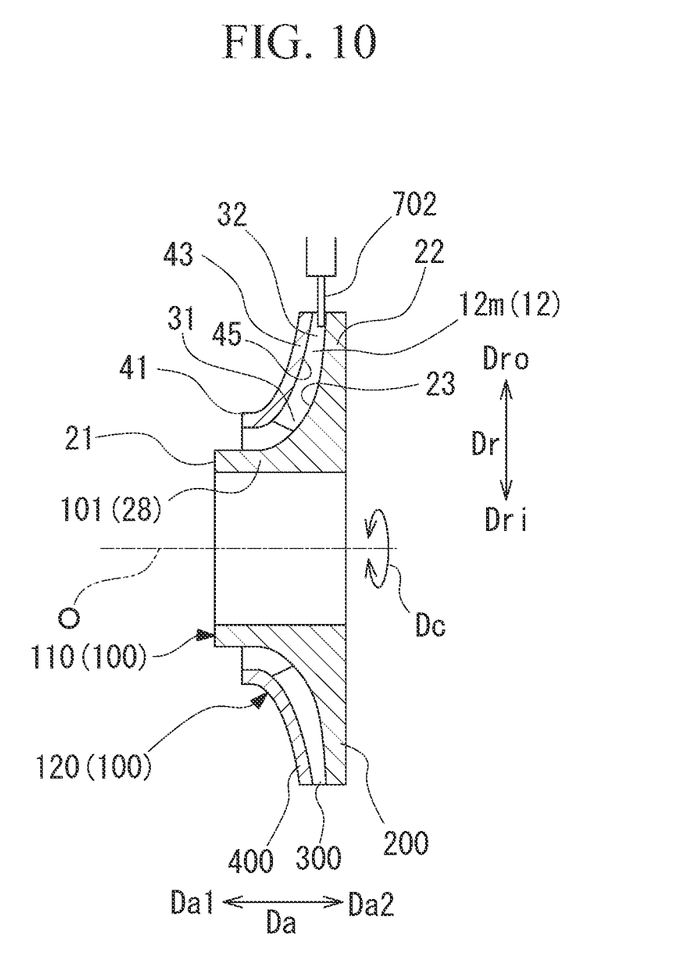
FIG. 10 is a sectional view showing a state in which an intermediate portion flow path of the impeller intermediate portion of the impeller shaped body is polished in an intermediate portion flow path polishing step according to the present embodiment.

After the impeller intermediate portion forming step S6 is completed, the intermediate portion flow path polishing step S7 is carried out. The intermediate portion flow path polishing step S7 of the present embodiment is the second grinding step S200. In the intermediate portion flow path polishing step S7, as shown in FIG. 10, in the impeller intermediate portion 120 formed in the impeller intermediate portion forming step S6, a surface to be the inner surface of the flow path 12 is polished. In the impeller intermediate portion 120, an intermediate portion flow path 12m constituting a part of the flow path 12 is formed by being surrounded by the disc intermediate portion 22, the cover intermediate portion 43, and the blade intermediate portions 32 of the blades 3 adjacent to each other in the circumferential direction Dc. In the intermediate portion flow path polishing step S7, a polishing tool 702 is inserted into the intermediate portion flow path 12m from the outer side Dro in the radial direction Dr, and the inner surface of the impeller intermediate portion 120 is polished. With this, a part of the disc concave surface 23, a part of the cover convex surface 45, a part of the blade concave surface 34A, and a part of the blade convex surface 34B are polished.

By repeating the impeller intermediate portion forming step S6 and the intermediate portion flow path polishing step S7 as necessary, the inner surface of the intermediate portion flow path 12m may be polished in the impeller shaped body 100 at each stage while increasing the diameter of the impeller shaped body 100 stepwise.

Figure 11:
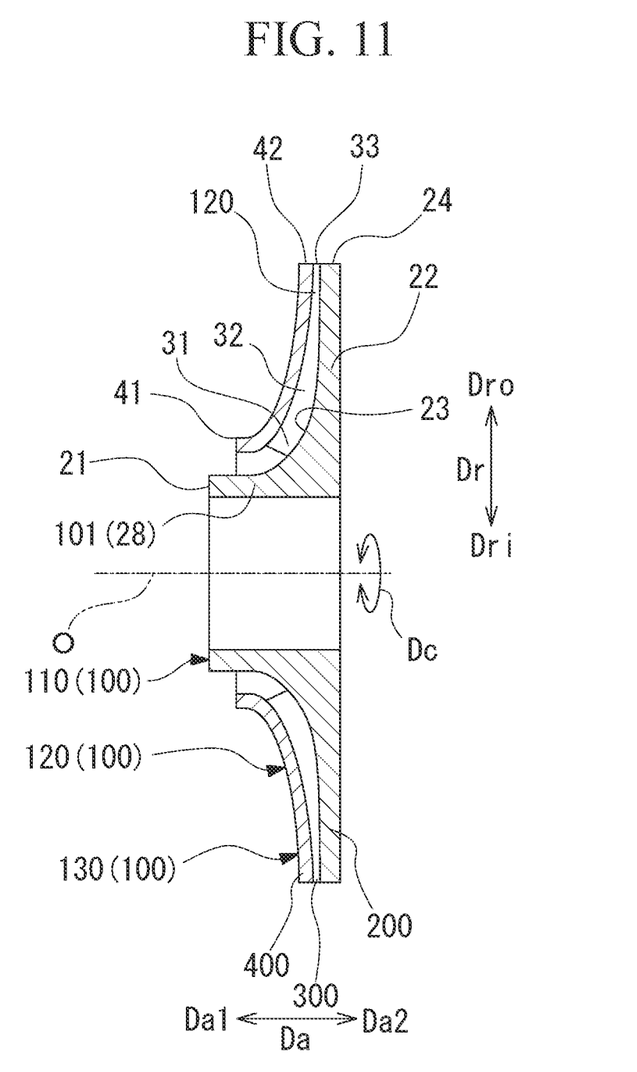
FIG. 11 is a sectional view showing a state in which an impeller outer peripheral portion of the impeller shaped body is formed in an impeller outer peripheral portion forming step according to the present embodiment.

After the intermediate portion flow path polishing step S7 is completed, the impeller outer peripheral portion forming step S8 is carried out. The impeller outer peripheral portion forming step S8 of the present embodiment is the third forming step S100. In the impeller outer peripheral portion forming step S8, as shown in FIG. 1I, the disc component pan 200, the blade component part 300, and the cover component part 400 are formed to extend further to the outer side Dro in the radial direction Dr from the impeller intermediate portion 120. With this, portions corresponding to the disc outer peripheral end 24, the blade outer peripheral end 33, and the cover outer peripheral end 42 are formed. In the impeller outer peripheral portion forming step S8, metal layers are sequentially laminated on the impeller intermediate portion 120 by an LMD method from the outer side Dro in the radial direction Dr such that the impeller intermediate portion 120 expands to the outer side Dro in the radial direction Dr by a predetermined dimension over the whole circumference when viewed from the axial direction Da. With this, the diameter of the impeller shaped body 100 gradually increases. As a result, an impeller outer peripheral portion 130 having the disc outer peripheral end 24, the blade outer peripheral end 33, and the cover outer peripheral end 42 is formed. The impeller outer peripheral portion 130 is a part of the impeller shaped body 100 and is a region continuous with the impeller intermediate portion 120 on the outer side Dro in the radial direction Dr.

Figure 12:
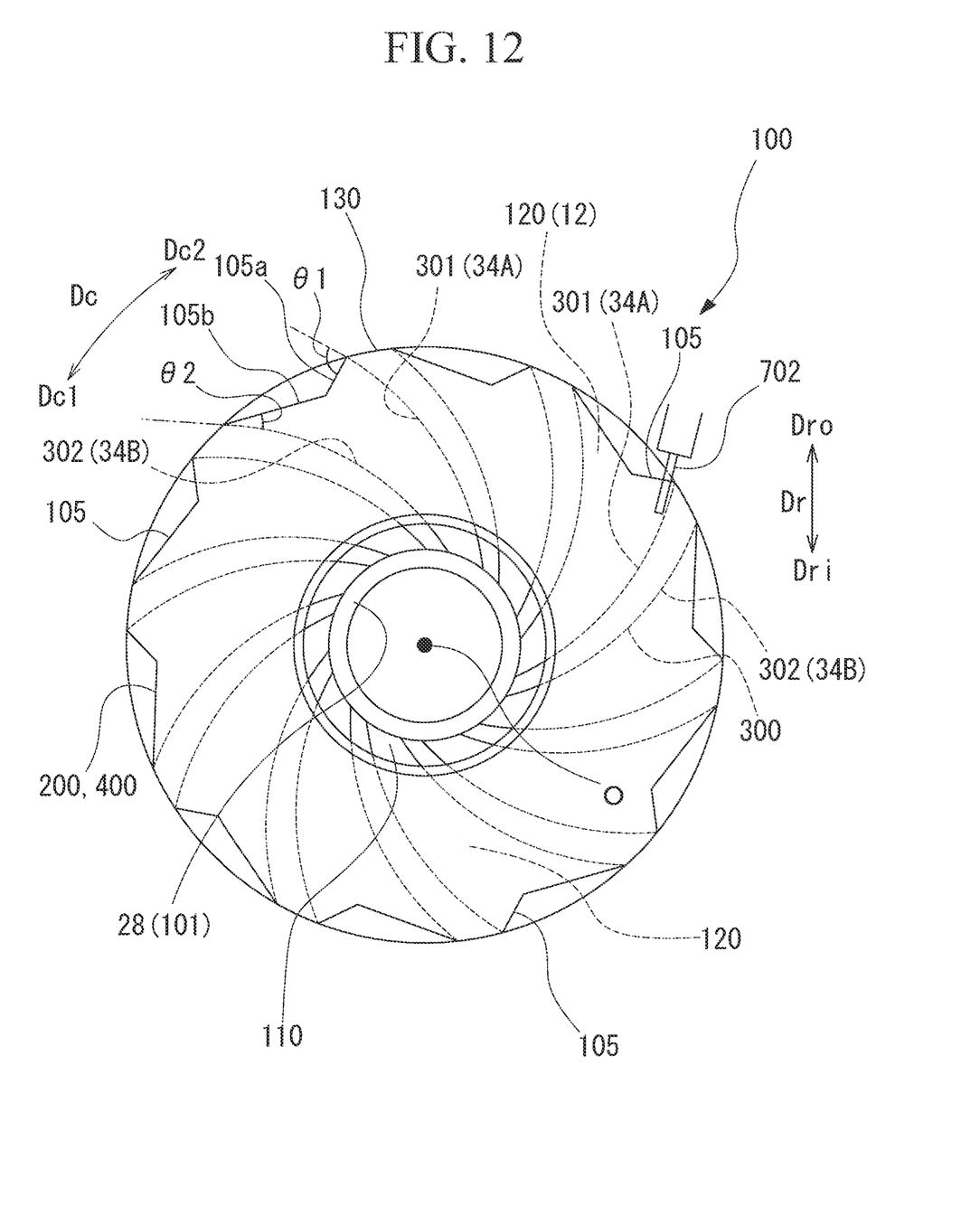
FIG. 12 is a view of a state in which a recess is formed on an outer edge of the impeller shaped body in a recess forming step according to the present embodiment, as viewed from the axial direction.

After the impeller outer peripheral portion forming step S8 is completed, the recess forming step S9 is carried out. The recess forming step S9 is a part of the grinding step S200. The recess forming step S9 is carried out before the outer peripheral portion flow path polishing step S10. In the recess forming step S9, as shown in FIG. 12, a recess 105 is formed by grinding the impeller outer peripheral portion 130 toward the inner side Dri in the radial direction Dr. In the recess forming step S9, an outer edge of the impeller outer peripheral portion 130 is ground from the outer side Dro in the radial direction Dr. In this case, the recess 105 is formed in a region of the impeller outer peripheral portion 130 where the polishing tool 702 interferes when polishing the flow path 12. Specifically, in the recess forming step S9, the recess 105 is formed between the blade component parts 300 adjacent to each other in the circumferential direction Dc when viewed from the axial direction Da. When the recess 105 is created in the present embodiment, only the disc component part 200 and the cover component part 400 are ground, and the blade component part 300 is not ground. With this, in the recess forming step S9, the recess 105 recessed to the inner side Dri in the radial direction Dr is formed on the outer edge of the impeller outer peripheral portion 130.

The recess 105 has a first surface 105*a* connected to a concave surface 301 of the blade component part 300 and a second surface 105*b* connected to a convex surface 302 of the blade component part 300 when viewed from the axial direction Da. The concave surface 301 is a curved surface which becomes the blade concave surface 34A when formation of the impeller 1 is completed. The convex surface 302 is a curved surface which becomes the blade convex surface 34B when formation of the impeller 1 is completed. The first surface 105*a* is formed such that an angle θ1 thereof with respect to a direction (virtual line extending the concave surface 301) in which the concave surface 301 extends at the outer edge of the impeller outer peripheral portion 130 is 90° or more when viewed from the axial direction Da. The first surface 105*a* of the present embodiment is formed to be 90° with respect to the direction in which the concave surface 301 extends at the outer edge of the impeller outer peripheral portion 130 when viewed from the axial direction Da. The second surface 105*b* is formed such that an angle θ2 thereof with respect to a direction (virtual line extending the convex surface 302) in which the convex surface 302 extends at the outer edge of the impeller outer peripheral portion 130 is as small as possible when viewed from the axial direction Da.

After the recess forming step S9 is completed, the outer peripheral portion flow path polishing step S10 is carried out. The outer peripheral portion flow path polishing step S10 is a part of the grinding step S200. The recess forming step S9 and the outer peripheral portion flow path polishing step S10 are the third grinding step S200 in the present embodiment. In the outer peripheral portion flow path polishing step S10, in the impeller outer peripheral portion 130 in which the recess 105 is formed in the recess forming step S9, a surface to be the inner surface of the flow path 12 is polished. In the impeller outer peripheral portion 130, an outer peripheral portion flow path 12*o* constituting a part of the flow path 12 is formed by being surrounded by the disc outer peripheral end 24, the cover outer peripheral end 42, and the blade outer peripheral ends 33 of the blades 3 adjacent to each other in the circumferential direction Dc. In the outer peripheral portion flow path polishing step S10, a polishing tool 702 is inserted into the outer peripheral portion flow path 12*o* from the outer side Dro in the radial direction Dr, and the inner surface of the impeller outer peripheral portion 130 is polished. With this, a pan of the disc concave surface 23, a part of the cover convex surface 45, a part of the blade concave surface 34A, and a part of the blade convex surface 34B are polished.

By repeating the impeller outer peripheral portion forming step S8, the recess forming step S9, and the outer peripheral portion flow path polishing step S10 as necessary, the inner surface of the outer peripheral portion flow path 12*o* may be polished in the impeller shaped body 100 at each stage while increasing the diameter of the impeller outer peripheral portion 130 stepwise. In this case, in the impeller outer peripheral portion forming step S8, metal layers are further laminated on the impeller outer peripheral portion 130 by additive manufacturing from the outer side Dro in the radial direction Dr such that the impeller outer peripheral portion 130 expands the outer side Dro in the radial direction Dr by a predetermined dimension over the whole circumference when viewed from the axial direction Da. With this, the impeller outer peripheral portion 130 is increased stepwise in diameter while maintaining a similar shape having the recess 105.

After the outer peripheral portion flow path polishing step S10 is completed, the outer peripheral shape forming step S11 is carried out. The outer peripheral shape forming step S11 of the present embodiment is the fourth forming step S100. In the outer peripheral shape forming step S11, a metal layer is laminated on the outer edge of the impeller outer peripheral portion 130 by an LMD method toward the outer side Dro in the radial direction Dr to fill the recess 105 when viewed from the axial direction Da. With this, as shown in FIGS. 1 and 2, the impeller shaped body 100 having a predetermined dimension and shape is formed. After that, formation of the impeller 1 is completed by polishing the flow path 12 at the outermost peripheral portion of the impeller shaped body 100.

(Effects)

In the manufacturing method S1 of the impeller having the above configuration, the forming step S100 and the grinding step S200 are repeatedly carried out by carrying out the support portion forming step S3 to the outer peripheral shape forming step S11. As a result, the shape of the impeller shaped body 100 can be adjusted at each stage while the impeller shaped body 100 is formed such that the diameter thereof increases stepwise. As a result, the impeller 1 can be satisfactorily formed with high accuracy by an additive manufacturing method.

In addition, as the grinding step S200, the intermediate portion flow path polishing step S7 is carried out after the impeller intermediate portion forming step S6, and the outer peripheral portion flow path polishing step S10 is carried out after the impeller outer peripheral portion forming step S8. As a result, the inner surface of the flow path 12 can be polished at each stage while the impeller shaped body 100 is formed such that the diameter thereof increases stepwise. In particular, in the present embodiment, the flow path 12 is formed such that a flow path sectional area thereof gradually decreases by narrowing a distance between the disc 2 and the cover 4 as being closer to the flow path outlet 12*b*. In this way, even in the flow path 12 where the polishing tool 702 for performing polishing work is difficult to enter, the entire flow path 12 can be polished with high accuracy by inserting the polishing tool 702 into every corner of the flow path 12. As a result, the impeller 1 can be formed with higher accuracy by an additive manufacturing method.

In addition, prior to the outer peripheral portion flow path polishing step S10, the recess forming step S9 of forming the recess 105 in the impeller outer peripheral portion 130 is carried out. With this, when the inner surface of the flow path 12 is polished, the polishing tool 702 can be inserted into the inmost part by reducing a region where the polishing tool 702 interferes. Therefore, the inner surface of the flow path 12 can be polished with high accuracy while suppressing interference of the polishing tool 702 with the impeller outer peripheral portion 130 of the impeller shaped body 100.

In addition, the recess 105 is formed between the blade component parts 300 adjacent to each other in the circumferential direction Dc. In particular, the recess 105 of the present embodiment is formed by grinding only the disc component part 200 and the cover component part 400. For this reason, even in a case where the distance between the disc 2 and the cover 4 is short and the blade concave surface 34A is curved to be recessed when viewed from the axial direction Da, the polishing tool 702 can reach every corner regardless of a polishing position. Therefore, the entire flow path 12 can be polished with very high accuracy.

In addition, after the recess 105 is formed, the impeller outer peripheral portion forming step S8 is carried out, whereby a metal layer is laminated such that the impeller shaped body 100 expands to the outer side Dro in the radial direction Dr by a predetermined dimension over the whole circumference. As a result, the impeller outer peripheral portion 130 is increased stepwise in diameter while maintaining a similar shape having the recess 105. Therefore, when viewed from the axial direction Da, as compared with a case where a metal layer is laminated in a circular shape to fill the recess 105, a cutting amount of the impeller outer peripheral portion 130 when the recess 105 is formed again can be suppressed. With this, a working speed when the recess 105 is formed again can be improved, and the impeller 1 can be rapidly manufactured.

In addition, the impeller shaped body 100 can be formed such that the diameter of the base member 101 having a tubular shape prepared in advance increases to the outer side Dro in the radial direction Dr. Therefore, it is not necessary to form most of the tubular portion 28 by laminating a metal layer by an additive manufacturing method, and a manufacturing speed of the tubular portion 28 can be improved. With this, the impeller 1 can be rapidly manufactured.

In addition, after the cover inner peripheral end 41 which is at least a part of the cover component part 400 is formed on the outer side Dro of the support portion 103 formed on the outer peripheral surface of the base member 101 in the radial direction Dr, the support portion 103 is removed. For this reason, even a structure which is formed at a position apart from the base member 101, such as the cover 4, can be smoothly formed.

(Other Embodiments)

Hitherto, the embodiment of the present disclosure has been described in detail with reference to the drawings. However, a specific configuration is not limited to the embodiment, and the present disclosure also includes a design change within the scope not departing from the concept of the present disclosure.

For example, the procedure of the manufacturing method S1 of the impeller having the above configuration is not limited to the above description, and can be appropriately changed. Therefore, the number of times the forming step S100 and the grinding step S200 are repeated is not limited to the present embodiment. In addition, the timing at which the recess 105 is formed is not limited to the present embodiment. The recess 105 need only be formed before polishing the inner surface of the flow path 12. Therefore, the recess 105 may be formed between the impeller intermediate portion forming step S6 and the intermediate portion flow path polishing step S7.

In addition, in the outer peripheral shape forming step S11, the impeller shaped body 100 having a predetermined dimension and shape need only be formed. Therefore, the outer peripheral shape forming step S11 is not limited to laminating a metal layer toward the outer side Dro in the radial direction Dr to fill the recess 105. For example, the impeller shaped body 100 having a predetermined dimension and shape may be formed by grinding a region of the impeller outer peripheral portion 130 protruding from the recess 105 to the outer side Dro in the radial direction Dr without carrying out the outer peripheral shape forming step S11 as the forming step S100.

In addition, in the manufacturing method S1 of the impeller, the base member preparation step S2 may not be carried out. Therefore, the tubular portion 28 may be formed from a position by an additive manufacturing method such as an LMD method without preparing the base member 101.

<Appendix>

The manufacturing method S1 of the impeller described in the embodiment is grasped as follows, for example.

(1) According to a first aspect, there is provided the manufacturing method S1 of the impeller that includes the disc 2 having the disc shape with the axis O as the center, the plurality of blades 3 formed on the surface of the disc 2 facing the first side Da1 in the axial direction Da in which the axis O extends at the interval in the circumferential direction Dc around the axis O, and the cover 4 covering the plurality of blades 3 from the first side Da1 in the axial direction Da and in which the flow path 12 is formed between the disc 2, the cover 4, and the plurality of blades 3, the manufacturing method including: the step S100 of forming the impeller shaped body 100 in which the disc component part 200 constituting a part of the disc 2, the blade component part 300 constituting a part of the plurality of blades 3, and the cover component part 400 constituting a part of the cover 4 are integrated by laminating the metal layer to extend toward the outer side Dro in the radial direction Dr with respect to the axis O by an additive manufacturing method using a metal powder; and the step S200 of grinding the impeller shaped body 100, in which the step S100 of forming the impeller shaped body and the step S200 of grinding the impeller shaped body are repeated a plurality of times, and the step S200 of grinding the impeller shaped body 100 includes the step of polishing the inner surface of the impeller shaped body 100 constituting a part of the flow path 12.

Examples of the additive manufacturing method using a metal powder include an LMD method.

With this, the inner surface of the flow path 12 can be polished at each stage while the impeller shaped body 100 is formed stepwise. For this reason, even in the flow path 12 where the polishing tool 702 for performing polishing work is difficult to enter, the entire flow path 12 can be polished with high accuracy by inserting the polishing tool 702 into every corner of the flow path 12. As a result, the impeller 1 can be formed with higher accuracy by an additive manufacturing method.

(2) The manufacturing method S1 of the impeller according to a second aspect is the manufacturing method S1 of the impeller in (1), in which the step S200 of grinding the impeller shaped body 100 includes the step S9 of forming the recess 105 recessed to the inner side Dri in the radial direction Dr from an outer peripheral portion of the impeller shaped body 100 by grinding the disc component part 200 and the cover component part 400 from the outer side Dro in the radial direction Dr before the step of polishing the inner surface of the flow path 12.

With this, when the inner surface of the flow path 12 is polished, the polishing tool 702 can be inserted into the inmost part by reducing a region where the polishing tool 702 interferes. Therefore, the inner surface of the flow path 12 can be polished with high accuracy while suppressing interference of the polishing tool 702 with the outer peripheral portion of the impeller shaped body 100.

(3) The manufacturing method S1 of the impeller according to a third aspect is the manufacturing method S1 of the impeller in (2), in which in the step of forming the recess 105, the recess 105 is formed between the blade component parts 300 adjacent to each other in the circumferential direction Dc around the axis O when viewed from the axial direction Da.

With this, even in a case where the distance between the disc 2 and the cover 4 is narrow and the blade concave surface is curved to be recessed when viewed from the axial direction Da, the polishing tool 702 can reach every corner regardless of a polishing position. Therefore, the entire flow path 12 can be polished with very high accuracy.

(4) The manufacturing method S1 of the impeller according to a fourth aspect is the manufacturing method S1 of the impeller in (2) or (3), in which in the step of forming the impeller shaped body 100, the metal layer is laminated such that the impeller shaped body 100 expands to the outer side Dro in the radial direction Dr by a predetermined dimension over the whole circumference when viewed from the axial direction Da after the step of forming the recess 105.

With this, the impeller outer peripheral portion is increased stepwise in diameter while maintaining a similar shape having the recess 105. Therefore, when viewed from the axial direction Da, as compared with a case where the metal layer is laminated in the circular shape to eliminate the recess 105, the cutting amount of the impeller outer peripheral portion when the recess 105 is formed again can be suppressed. With this, a working speed when the recess 105 is formed again can be improved, and the impeller 1 can be rapidly manufactured.

(5) The manufacturing method S1 of the impeller according to a fifth aspect is the manufacturing method S1 of the impeller in any one of (1) to (4), further including the step of preparing the base member 101 having the tubular shape that extends in the axial direction Da before the step of forming the impeller shaped body 100, in which in the step of forming the impeller shaped body 100, the metal layer is laminated on the base member 101 toward the outer side Dro in the radial direction Dr.

With this, the impeller shaped body 100 can be formed such that the diameter of the base member 101 having a tubular shape prepared in advance increases to the outer side Dro in the radial direction Dr. Therefore, it is not necessary to form most of the central portion of the impeller 1 by laminating the metal layer by an additive manufacturing method, and a manufacturing speed of the central portion of the impeller 1 can be improved. With this, the impeller 1 can be rapidly manufactured.

(6) The manufacturing method S1 of the impeller according to a sixth aspect is the manufacturing method S1 of the impeller in (5), in which the step of forming the impeller shaped body 100 includes the step of forming the support portion 103 protruding toward the outer side Dro in the radial direction Dr from the base member 101 on the outer peripheral surface of the base member 101, and the step of forming at least a part of the cover component part 400 by laminating the metal layer on the outer side Dro in the radial direction Dr with respect to the support portion 103, and the step of grinding the impeller shaped body 100 includes the step of removing the support portion 103 disposed between the base member 101 and the cover component part 400 from the axial direction Da.

With this, even a structure which is formed at a position apart from the base member 101, such as the cover 4, can be smoothly formed.

INDUSTRIAL APPLICABILITY

According to the manufacturing method of the impeller of the present disclosure, an impeller having a blade sufficiently polished can be formed by an additive manufacturing method.

EXPLANATION OF REFERENCES

1: impeller
1a: inlet side end
1b: outlet side end
2: disc
3: blade
4: cover
12: flow path
12a: flow path inlet
12b: flow path outlet
12m: intermediate portion flow path
12o: outer peripheral portion flow path
21: disc inner peripheral end
22: disc intermediate portion
23: disc concave surface (surface facing first side in axial direction
24: disc outer peripheral end
28: tubular portion
28h: shaft insertion hole
29: disc main body
31: blade inner peripheral end
32: blade intermediate portion
33: blade outer peripheral end
34A: blade concave surface
34B: blade convex surface
41: cover inner peripheral end
42: cover outer peripheral end
43: cover intermediate portion
45: cover convex surface
100: impeller shaped body
110: impeller inner peripheral portion
120: impeller intermediate portion
130: impeller outer peripheral portion
101: base member
102: base portion
103: support portion
1031: annular base part
1032: support protrusion part
105: recess
105a: first surface
105b: second surface
200: disc component part
300: blade component part
301: concave surface
302: convex surface
400: cover component part
701: cutting tool
702: polishing tool
Da: axial direction
Da1: first side
Da2: second side
Dc: circumferential direction
Dc1: first side
Dc2: second side
Dr: radial direction Dri: inner side
Dro: outer side
O: axis
S1: manufacturing method
S2: base member preparation step (step of preparing base member)
S100: forming step (step of forming impeller shaped body)
S200: grinding step (step of grinding impeller shaped body)
S3: support portion forming step (step of forming support portion)
S4: impeller inner peripheral portion forming step (step of forming at least a part of cover component part)
S5: support portion removing step (step of removing support portion)
S6: impeller intermediate portion forming step
S7: intermediate portion flow path polishing step (step of polishing inner surface of flow path)
S8: impeller outer peripheral portion forming step
S9: recess forming step (step of forming recess)
S10: outer peripheral portion flow path polishing step (step of polishing inner surface of flow path)
S11: outer peripheral shape forming step

What is claimed is:

1. A manufacturing method of an impeller that includes a disc having a disc shape with an axis as a center, a plurality of blades formed on a surface of the disc facing a first side in an axial direction in which the axis extends at an interval in a circumferential direction around the axis, and a cover covering the plurality of blades from the first side in the axial direction and in which a flow path is formed between the disc, the cover, and the plurality of blades, the manufacturing method comprising:
   a step of forming an impeller shaped body in which a disc component part constituting a part of the disc, a blade component part constituting a part of the plurality of blades, and a cover component part constituting a part of the cover are integrated by laminating a metal layer to extend toward an outer side in a radial direction with respect to the axis by an additive manufacturing method using a metal powder; and
   a step of grinding the impeller shaped body, wherein
   the step of forming the impeller shaped body and the step of grinding the impeller shaped body are repeated a plurality of times,
   the step of grinding the impeller shaped body includes a step of polishing an inner surface of the impeller shaped body constituting a part of the flow path,
   the step of grinding the impeller shaped body includes a step of forming a recess recessed to an inner side in the radial direction from an outer peripheral portion of the impeller shaped body by grinding the disc component part and the cover component part from the outer side in the radial direction before the step of polishing the inner surface of the flow path, and
   in the step of forming the recess, the recess is formed between the blade component parts adjacent to each other in the circumferential direction around the axis when viewed from the axial direction.

2. The manufacturing method of an impeller according to claim 1, wherein in the step of forming the impeller shaped body, the metal layer is laminated such that the impeller shaped body expands to the outer side in the radial direction by a predetermined dimension over a whole circumference when viewed from the axial direction after the step of forming the recess.

3. The manufacturing method of an impeller according to claim 1, further comprising:
   a step of preparing a base member having a tubular shape that extends in the axial direction before the step of forming the impeller shaped body, wherein
   in the step of forming the impeller shaped body, the metal layer is laminated on the base member toward the outer side in the radial direction.

4. The manufacturing method of an impeller according to claim 3, wherein
   the step of forming the impeller shaped body includes a step of forming a support portion protruding toward the outer side in the radial direction from the base member on an outer peripheral surface of the base member, and a step of forming at least a part of the cover component part by laminating the metal layer on the outer side in the radial direction with respect to the support portion, and
   the step of grinding the impeller shaped body includes a step of removing the support portion disposed between the base member and the cover component part from the axial direction.

\* \* \* \* \*